United States Patent [19]

Ackermann et al.

[11] Patent Number: 4,669,048
[45] Date of Patent: May 26, 1987

[54] COMPUTER-CONTROLLED EVALUATION OF AERIAL STEREO IMAGES

[75] Inventors: Fritz Ackermann, Stuttgart; Karl Felle, Oberkochen; Dierk Hobbie, Königsbronn, all of Fed. Rep. of Germany

[73] Assignee: Carl-Zeiss-Stiftung, Heidenheim, Fed. Rep. of Germany

[21] Appl. No.: 650,813

[22] Filed: Sep. 14, 1984

[51] Int. Cl.$^4$ .............................................. B43L 13/16
[52] U.S. Cl. ..................................... 364/525; 350/136
[58] Field of Search ................ 364/575; 350/136, 139; 250/558; 352/57, 58, 63

[56] References Cited

U.S. PATENT DOCUMENTS

4,317,286  3/1982  Elfick et al. ..................... 350/136

Primary Examiner—Arthur G. Evans
Attorney, Agent, or Firm—Walter Ottesen

[57] ABSTRACT

The invention is directed to an apparatus for evaluating aerial stereo images. The apparatus includes an analytical plotter which is supplemented with an ancillary device for photoelectrically scanning and digitalizing subregions of both stereo images. The signals of the device are computer-correlated with each other to automatically, for example, determine the coordinates of homologous points and the occurring parallaxes. A method of carrying out the invention is also disclosed.

7 Claims, 1 Drawing Figure

COMPUTER-CONTROLLED EVALUATION OF AERIAL STEREO IMAGES

FIELD OF THE INVENTION

The invention relates to a method for evaluating aerial stereo images with the aid of a so-called analytical plotter which is provided with a device for photoelectrically scanning and digitalizing subregions of both stereo images. The signals of the device are computer-correlated with each other to automatically, for example, determine the coordinates of homologous points and the occurring parallaxes.

BACKGROUND OF THE INVENTION

Stereo evaluation apparatus with electronic ancillary devices for automatic correlation have been known for some time. For example, a stereo evaluation apparatus with an electronic correlator is described in "Photogrammetric Engineering", 1969, Volume 35, Number 8, pages 780 to 788. This stereo evaluation apparatus determines x-parallaxes in the evaluation procedure and derives signals therefrom which serve to position the elevation of the z-carriage of the evaluation apparatus which functions pursuant to the principle of mechanical projection.

The ancillary device aids in photoelectrically scanning the stereo images in order to obtain the signals for the correlator and includes flying spot scanners having scanning rasters which must be distorted during the scanning procedure for adaptation to the image geometry. In practice, this causes considerable problems since instabilities of the raster-form affect the correlation. In addition, since analog signals are correlated with each other which cannot be stored with this device, only image regions can be correlated with each other on the stereo images which have just been presented. It is not possible to obtain a correlation with additional aerial images, for example, for the purposes of point transformation or for making deformation measurements. The same disadvantages are associated with the apparatus described in United Kingdom Pat. No. 1,231,998 and U.S. Pat. No. 3,901,595.

In U.S. Pat. No. 3,883,251, a method for evaluating stereo images is described wherein the images are sequentially applied to a monocomparator and are photoelectrically scanned and the stored signals are subsequently correlated with each other. The scanning is achieved by displacement of the carriage in a direction beneath a linear array of detectors orientated with respect to the image in correspondence to the epipolar line geometry. This method does not offer the user a stereo view and is not suitable to facilitate for the operator the evaluation of aerial images on stereo evaluation apparatus in the context of a computer-supported semiautomatic mode of operation.

The known correlators utilized in combination with stereo plotters are relatively costly ancillary devices for whose implementation a great many physical changes have to be made on the evaluation apparatus. The foregoing notwithstanding, these correlators essentially simply permit only an automatic determination of x-parallaxes and therefore are suitable exclusively for the determination of contour interval lines or for making orthophotos. In these apparatus too, the stereo images must be manually orientated by the operator before the actual automatic evaluation.

SUMMARY OF THE INVENTION

In contrast thereto, it is an object of the invention to provide a method and apparatus with the aid of which a great many procedures on stereo evaluating apparatus can be partially automated which had previously been performed manually, such as establishing the inner or absolute orientation of both stereo images, the transfer of points for aerial image triangulation et cetera.

It is a further object of the invention to build the necessary ancillary device into a conventional analytic plotter suitable for this purpose without great expense.

The analytical stereo evaluating apparatus of the invention includes two movable image carriages for receiving stereo images thereon; binocular viewing tube means defining mutually adjacent optical viewing channels for viewing the images on the carriages; light source means for projecting respective beams of light into the viewing channels so as to illuminate the images for viewing by an operator; computer-controlled drive means for movably adjusting said carriages with respect to the viewing beams; two first optical means for reflecting respective measuring marks into corresponding ones of the channels for viewing by the operator; and, an ancillary device for photoelectrically scanning subregions of the stereo images, the ancillary device including: two beam splitters arranged in respective ones of the viewing channels for diverting a portion of the light away therefrom to define respective diverted light beams; two 2-dimensional photoelectric detector arrays arranged in the paths of the diverted light beams, respectively; two second optical means arranged in the paths of the diverted light beams for imaging the respective central parts of the viewed images on the photoelectric arrays, respectively; computer means receiving video signals from the arrays for storing the same as gray-value matrices and for correlating the latter with each other; and, feedback means connecting the computer means to the drive means for transmitting feedback signals to the latter to movably adjust the carriages.

Because a two-dimensional solid state video camera is utilized in lieu of the known flying spot scanner, it is possible without additional illuminating equipment as well as without additional movable elements for the scanning device, to photoelectrically scan the central subregion of the stereo model with a high signal to noise ratio during the visual observation and to store the same in the form of gray-value matrices for the parallel running correlation in the computer. The coordinates of corresponding points of both stereo images are then determined in the region of measuring marks seen by the operator.

With the aid of this ancillary device, a method of operating is made possible whereby the operator coarsely approaches the image points of interest with the measuring marks and allows the computer to take over the precise determination of the parallaxes. Since the correlation of the image regions present in the form of gray-value matrices is performed in two dimensions, the method can be applied already with the procedure of establishing the relative orientation of images by means of which the vertical parallaxes (y-parallaxes) of a predetermined number of image point pairs are determined.

This method of the invention includes the steps of: coarsely preorientating the stereo images; going to selected points on the stereo images and adjusting the same so that they lie in the effective region of the scanning field; generating and digitalizating gray-value matrices of image regions detected by the scanning fields and storing the gray-value matrices in the computer whereby each matrix element is defined by its image coordinates and the photoelectrically determined gray value corresponding thereto; correlating the gray-value matrices corresponding to both stereo images with each other in two dimensions whereby the matrices are subjected to different geometric and radiometric transformations until the gray-value differences of corresponding matrix elements or of the corresponding correlating functions of both fields are a minimum; and, utilizing the determined transformation parameters to produce in a computer-controlled manner the orientation of the stereo image pair.

Furthermore, the method according to the invention can be so modified that it can be utilized for point transfer for the purpose of aerial triangulation without having to mark corresponding points on the mutually over-lapping images. Rather, the regions of interest are coarsely approached and stored in the computer with the corresponding gray-value matrix. The exact correlation to corresponding points on the subsequent aerial images is achieved by correlation of the gray-value matrices by means of which the points are identified with a sufficiently high accuracy.

Pursuant to the same method, deformation measurements can be carried out by means of which aerial images taken at different points in time are compared to each other in order to determine deformations in structures, changes in open pit mines and waste dumps.

Synthetic gray-value matrices of signalized points such as fiducial marks are stored in the computer for the absolute and the inner orientation of images. The scanning field then merely has to be coarsely set by the operator on the fiducial marks. The exact coordinates of the fiducial marks are subsequently computed by correlating the measured gray-value matrices with the stored synthetic gray-value matrices.

In the correlation of the gray-value matrices delivered by the video cameras, it is purposeful to carry out the transformation in iterative steps between which the newly formed coordinates of each matrix element are obtained by means of a linear interpolation of the measured values from four neighboring matrix elements. This significantly reduces the time needed for correlation.

Furthermore, it is advantageous to compute and print out for every correlated image point, the values for the correlation coefficient $p$ and the standard deviation $\sigma$ for its coordinates. In this way, the operator obtains an indication of the quality of the correlation and can recognize errors which may occur.

These and other advantages of the invention will become apparent from the following discussion of the preferred embodiments of the invention.

DESCRIPTION OF THE PREFERRED EMBODIMENTS OF THE INVENTION

Figure 1:
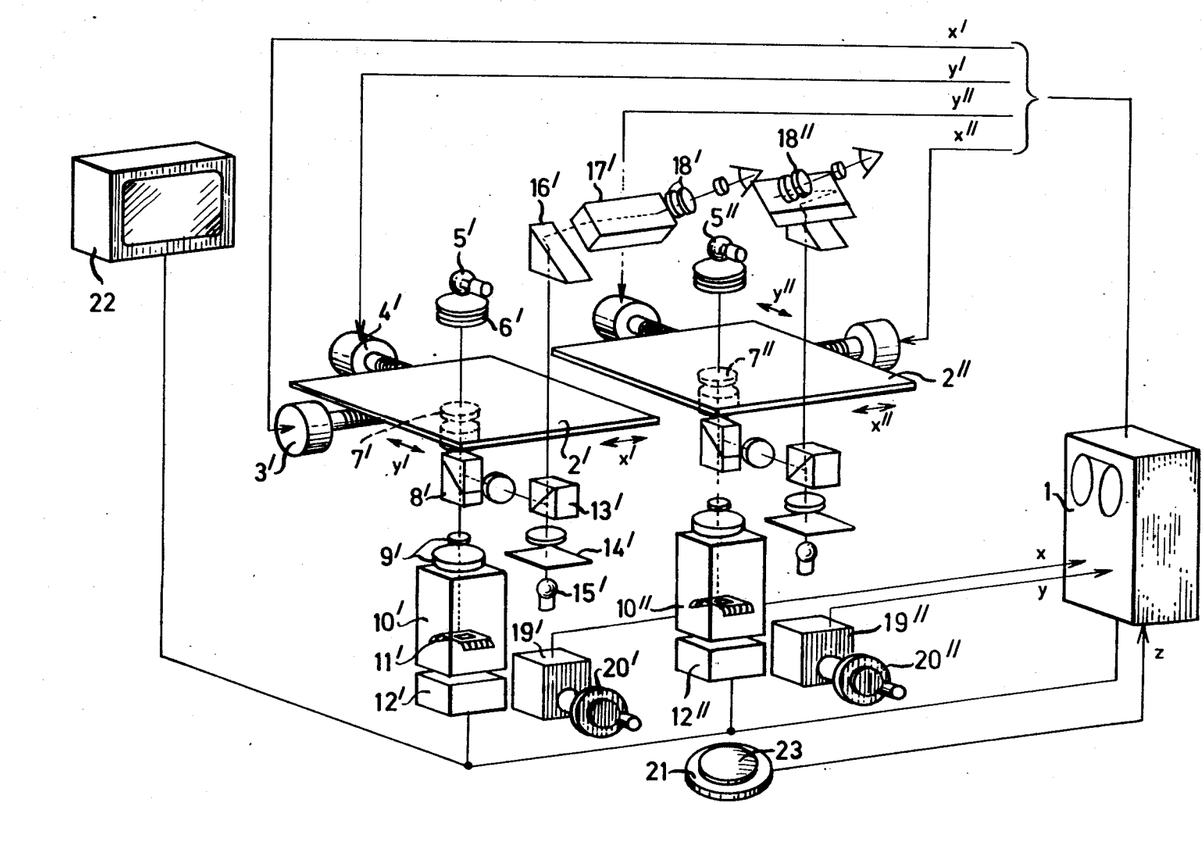
The drawing is a perspective schematic of an embodiment of the apparatus of the invention and shows an analytic plotter equipped with an ancillary device.

The drawing shows the analytical plotter with respect to its essential optical and electronic components. The analytical plotter includes a computer 1 which controls the movement of two image carriers 2′ and 2″ mounted on movable carriages (not illustrated) in the plane indicated by arrows x′, y′ and x″, y″ with the aid of motors 3′, 4′ and 3″, 4″, respectively.

The two manually actuated drive wheels 20′ and 20″ as well as the foot disc 21 provide control quantities from which the computer computes the individual displacements for the two image carriers 2′ and 2″. The manual drive wheels 20′, 20″ and foot disc 21 are equipped with encoders 19′, 19″ and 23, respectively, that generate signals which are fed to the computer 1.

The stereo images on the image carriers 2′ and 2″ are observed by the operator with the aid of a binocular viewing tube 18′ and 18″ via the optical systems which will now be described. These optical systems are completely symmetrical so that only the left-hand optical system will be described in the following. For each viewing channel, the optical system includes a light source 5′ with a condenser 6′ for observing the field of view seen by the operator. This optical system further includes an objective 7′ as well as a first beam splitter in the form of a prism 8′ arranged therebehind which deflects the viewing beam path in a direction toward a second beam splitter 13′.

The measuring mark 14′ illuminated by the second light source 15′ is reflected into the viewing beam path via beam splitter 13′. The viewing beam path reaches the ocular 18′ via two further deflecting prisms 16′ and 17′.

The assembly described above corresponds essentially to a known analytical plotter manufactured by Carl Zeiss of Oberkochen in the Federal Republic of Germany and is known as Planicomp C 100.

According to a feature of the invention, the prism 8′ is configured as a beam splitter which splits off fifteen percent of the light in the direction toward the objective 9′ arranged therebeneath. The objective 9′ is part of a two-dimensional CCD-Camera 10′. Such a CCD matrix camera is sold commercially under the designation C 1000-35 M by the Hamamatsu Company and has a resolution of 320 horizontal and 244 vertical image elements of a 27 by 27 $\mu$m light sensitive pixel surface.

The image scale of the optical component 9′ is so selected that the combination of component 9′ and objective 7′ can image the central part of the field of view seen by the observer and surrounding the measuring marks upon the surface 11′ of the array with a magnification of 1.35. In this way, the resolution with which the camera 10′ scans the aerial image on the carrier 2′ is 20 $\mu$m.

CCD Cameras 10′ and 10″ with corresponding control circuits 12′ and 12″, respectively, are provided for respective ones of the two stereo images. Both arrays are connected with the computer 1 and a monitor 22 via these control circuits. The image subregion perceived by the arrays is displayed on the monitor 22.

The control circuits 12′ and 12″ include an analog-to-digital converter which digitalizes the analog signal arising from the columnar-like scan of the array with a resolution of 256 gray values. The images of both cameras are then accepted by the computer in the form of gray-value matrices. Also, the coordinates x′ and y′ are assigned to each matrix element in addition to its gray-value and these coordinates correspond to its position in the scanned image field.

The entire matrix surface as well as a rectangular window can be scanned via the computer and the control circuit with any desired number of columns and lines and displayed on the monitor 22. The sub-regions of the images are correlated in the computer 1 in a manner described below in order to obtain control data for a semiautomatic mode of operation of the analytical plotter to facilitate the evaluation procedure.

For a digital image correlation it is assumed that two homologous image windows of a pair of overlapping photographs are digitized resulting in two gray-value matrices.

$G_1 = G_1(x'_i, y'_i) = G_1(x_i, y_i)$ for the left window and
$G_2 = G_2(x''_i, y''_i) = G_2(x_i, y_1)$ for the right window.

The pixel arrays define the local coordinate systems. The image contents of the two windows are supposed to overlap sufficiently, that is, to cover about the same object area.

The task of image correlation is then to transform, say, $G_2$ onto $G_1$ in such a way that a best match is obtained, or more specifically, that a certain correlation function is optimized.

There are several such correlation functions available which might be applied. The most common are maximization of the correlation coefficient or minimization of the (root mean square value of the) remaining differences. In either case the cross-products or the differences of gray values of nominally related pixels are used.

The two gray-value matrices are not identical, for radiometric and for geometrical reasons as will be explained below.

The causes for radiometric differences are: that radiation from an object depends on spatial direction; degradation by atmosphere (and camera); differences in film processing; and, possible differences in the digitalization procedure. On the other hand, the causes for geometrical differences are: different camera orientation, perspective image distortion; relief displacement; and, different image distortion.

For high precision image correlation such effects have to be compensated for, to a sufficient degree, at least.

The commonly applied procedures of image correlation obtain the correlation by a systematic trial and error procedure. One window is systematically shifted, until for instance maximum correlation is obtained.

The definite shift values, which represent the local parallax x and y (related to the coordinate systems used) are obtained finally by interpolation. This procedure operates well; it is, however, not too satisfactory from a methodical point of view.

According to the invention, the transformation parameters are introduced as unknowns which are determined directly by a least squares solution. This approach also allows extending the number of parameters sufficiently in order to compensate for radiometric and geometrical differences of the two windows. In connection with this approach, it is advantageous to obtain image correlation by minimizing the gray-value differences rather than maximizing the correlation coefficient.

Principle of Approach (one-dimensional)

The approach may be explained for the one-dimensional case.

The gray values of the (linear) pixel arrays from the left-hand and the right-hand image windows represent (discrete) gray-value functions $g_1(x')$ and $g_2(x''_i)$, referring to the coordinate systems $x'$ and $x''$, respectively.

If both coordinate systems, which are sufficiently identical, are superimposed (and relabeled, $x' \to x'' \to x$) we obtain $g_1(x)$ and $g_2(x)$ with regard to nominally the same reference system.

Assuming that both functions are equal, except for a shift $x_o$ of $g_2$ against $g_1$ and for perturbation by noise, $n_1(x_i)$ and $n_2(x_i)$.

We then obtain for the observed functions:

$$\bar{g}_1(x_i) = g_1(x_i) + n_1(x_i) \qquad (a)$$

$$\bar{g}_2(x_i) = g_2(x_i) + n_2(x_i)$$

$$= g_1(x_i - x_o) + n_2(x_i)$$

Consider now the gray-value differences $\Delta g(x_i)$ of nominally corresponding pixels i:

$$\Delta g(x_i) = \bar{g}_2(x_i) - \bar{g}_1(x_i) \qquad (b)$$

$$= g_2(x_i) + n_2(x_i) - g_1(x_i) - n_1(x_i)$$

$$= g_1(x_i - x_o) - g_1(x_i) + n_2(x_i) - n_1(x_i)$$

Now, $g_1(x_i - x_o)$ is linearized with regard to $x_o$, expanding from the approximation $x_o = 0$:

$$g_1(x_i - x_o) = g_1(x_i) - \frac{\Delta g(x_i)}{\Delta x_o} x_o \qquad (c)$$

$$= g_1(x_i) - \dot{g}_1(x_i) \cdot x_o$$

If, in addition, the symbol $v(x_i)$ is, substituted for the difference of the noise components:

$$v(x_i) = n_1(x_i) - n_2(x_i)$$

equation (b) can be rewritten:

$$\Delta g(x_i) + v(x_i) = -\dot{g}_1(x_i) \cdot x_o \qquad (d)$$

Here, $\Delta g(x_i)$ is the difference of the observed gray values, $\dot{g}_1(x_1)$ the gradient of $g_1(x_i)$ which can be approximated by the gradient of $\bar{g}_1(x_i)$. $x_o$ is the unknown shift parameter of $g_2$ against $g_1$, and should be differentially small.

Equation (d) has the form of linearized observational equations, with the observations $\Delta g(x_i)$ and the unknown $x_o$. They could be solved directly by least squares techniques for the unknown $x_o$, thus minimizing $$\Sigma v^2(x_i) = \Sigma(n_2(x_i) - n_1(x_i))^2 \qquad (e)$$

The solution $x_o$ will correspond to the minimum of equation (e), that is, it will represent the shift (parallax) of $g_2$ against $g_1$.

As for each pair of corresponding pixels, one equation (d) is obtained, the least squares solution for $x_o$ will be highly redundant.

The basic equation (d) is linearized, starting from the approximation $g_1(x_i) = g_2(x_i)$. As this is normally a poor initial approximation, the solution has to be iterated, by relinearization after each step. This implies interpolation of the gray values into the transformed coordinate system (on redefined pixels) which is known as resampling as will be shown below.

Generalization to two Dimensions

We now generalize the described approach to the two-dimensional case. The observed discrete gray-value functions $\bar{g}_1(x_i, y_j)$ and $\bar{g}_2(x_i, y_j)$ are given. $\bar{g}_1$ represents the actual function $g_1$ disturbed by noise $n_1(x_i, y_j)$. $\bar{g}_2$ is assumed to be related to $g_1$ by: a geometrical transformation (distortion) $T_G$; a radiometric transformation (distortion) $T_R$; and, perturbed by noise.

Using a simplified notation:

$$g_1(x_i, y_j) = g_1(z_i)$$

$$g_2(x_i, y_j) = g_2(z_j) \tag{f}$$

Considering first the geometrical transformation $T_G$ $$z'_i = T_G(z_i, a_m), \quad m = 1 \ldots m$$

giving $$g'_1(z_i, a_m) = g_1(T_G(z_i, a_m)) \tag{g}$$

and then the radiometric transformation $T_R$ $$g''_1(z_1, a_m, h_k) = T_R(g'_1(z_i, a_m), h_k) = T_R(g_1(T_G(z_i, a_m)), h_k); \tag{h}$$

wherein: $k = 1 \ldots k$

According to the basic assumption, $g''_1$ is sufficiently identical with $g_2$:

$$g''_1(z_i, a_m, h_k) = g_2(z_i) \tag{i}$$

If noise $n_2(z_i)$ is added to $g_1$ directly, for sake of simplicity (it might also be added to $g'_1$, or $g''_1$, as the assumptions about its origin might dictate), the following is obtained for the difference $\Delta g$ of the observed functions $\bar{g}_1$ and $\bar{g}_2$:

$$\Delta g(z_i) = \bar{g}_2(z_i) - \bar{g}_1(z_i) \tag{j}$$

$$= g_2(z_i) - g_1(z_i) + n_2(z_i) - n_1(z_i)$$

$$= g''_1(z_i, a_m, h_k) - g_1(z_i) + n_2(z_i) - n_1(z_i)$$

$$= T_R(g_1(T_G(z_i, a_m)), h_k) - g_1(z_i) + n_2(z_i) - n_1(z_i)$$

This relationship includes the unknown transformation parameters $a_m$ and $h_k$. Replacing the noise difference by $v(z_i)$:

$$v(z_i) = n_1(z_i) - n_2(z_i), \text{ and}$$

expanding equation (j) to first order terms, starting from approximate values $a_m^0$ and $h_k^0$, the following is obtained:

$$\Delta g(z_i) + v(z_i) = g''_1(z_i, a_m^0, h_k^0) + \sum_m \left(\frac{\partial g''_1}{\partial a_m}\right)_0 \cdot da_m + \sum_k \left(\frac{\partial g''_1}{\partial h_k}\right)_0 \cdot dh_k - g_1(z_i) \tag{k}$$

If the expansion starts from zero values, then $$g''_1(z_i, a_m^0, h_k^0) = g_1(z_i)$$

and equation (k) simplifies to:

$$\Delta g(z_i) + v(z_i) = \sum_m \left(\frac{\partial g''_1}{\partial a_m}\right)_0 da_m + \sum_k \left(\frac{\partial g''_1}{\partial h_k}\right)_0 dh_k \tag{1}$$

Equation (1) represents a linearized observation equation for each pair of related pixels. The "observations" $\Delta g$ are given weight 1, and the solution for the unknown (increments of the) transformation parameters $a_m$ and $h_k$ can be obtained with the standard least squares techniques.

The partial derivatives, serving as coefficients of differential increments of the unknown parameters, are approximated from the available function $\bar{g}_1''$ or from filtered modifications of it, replacing $g_1''$. Redundancy of the system is high, as the normal equations are of the order (m+k) only.

It should be noted that instead of equation (j), an alternate approach is possible, by not using directly the difference $\Delta g = \bar{g}_2 - \bar{g}_1$, but rather the difference $\Delta g = \bar{g}_2 - \bar{g}_1''$, where $\bar{g}_1''$ is the result of a preliminary transformation $\bar{g}_1''(z_1, a_m^0, h_k^0) = T_R(\bar{g}_1(T_G(z_i, a_m^0)), h_k^0)$ with the approximate transformation parameters $a_m^0$ and $h_k^0$. This approach is actually used in the procedure, as it has advantages in the iteration procedure.

Resampling

The basic equation (1) is linearized, starting from poor approximate values for the unknown transformation parameters. The solution is therefore obtained by iterative steps. This implies resampling, as after each transformation step, a new set of pixels has to be created.

Originally we applied a sophisticated interpolation method for interpolation of gray values referring to a new grid of pixels. The gray value at an arbitrary point (x,y) was obtained by a linear combination of covariance functions relating to a limited number (4 or 12) of surrounding pixels. It was found, however, that a bilinear interpolation from the surrounding 4 pixel values is sufficient. This procedure is now used; it simplifies and shortens the numerical computations of resampling considerably.

Transformations

Equation (1) has been kept general with regard to the geometrical and radiometric transformations, the parameters of which constitute the unknowns of the problem which is to be solved directly, in various iteration steps.

Considering that only small windows are being dealt with, then the geometrical transformations need not go to higher degree terms. Only 4 and 6 parameter linear transformations have to be programmed (similarity and affine transformation). This is quite sufficient for locally smooth ground areas, the relief displacement being the only effective cause of distortion.

The radiometric adaptation can be restricted to the transformation:

$$g'''_1 = g'_1 \cdot h_1 + h_2 \tag{m}$$

The two parameters $h_1$ and $h_2$ correct for zero-level shift and overall scale difference between the gray values of both windows.

Accuracy Criteria and Definition of Parallax

After each iteration step, and after applying the transformation and resampling, the correlation coefficient is calculated from the products of gray values of corresponding pairs of pixels:

$$f_{g_1 g_2} = \frac{\sum_i g_1(z_i) \cdot g_2(z_i)}{\sqrt{\sum_i g_1(z_i)^2 \cdot \sum_i g_2(z_i)^2}} \quad (n)$$

Here, the values of $g_1$ and $g_2$ are reduced to the average gray values of each window as zero reference. The correlation coefficient is an indicator for the level and the quality of image correlation, which has been obtained. It is not used here as convergence criterion. The quantity $\rho$ can reach values as high as 0.99.

Accuracy criteria for the result are obtained from the least squares adjustment in the usual way.

First the variance factor $\sigma_0^2$ is estimated:

$$\sigma_0^2 = \frac{\sum_n (v(z_i))^2}{n - u} = \frac{\sum_n (\Delta g(z_i))^2}{n - u} \quad (o)$$

wherein:

n = number of pixels involved, and
u = number of unknown transformation parameters.

$\Delta g$ represents the differences between the transformed gray values of the correlated windows remaining after the last iteration step. Thus, $\hat{\sigma}_0$ is a truely empirical indicator for the "goodness of match".

With $\hat{\sigma}_0$, the standard errors of the unknown transformation parameters (or of functions of them) can be derived; of which especially the geometrical parameters are of interest:

$$\hat{\sigma}_{am} = \hat{\sigma}_0 \sqrt{Q_{amam'}} \quad (p)$$

where $Q_{amam'}$ is obtained from the inversion of the (small) system of normal equations. The standard deviations $\hat{\sigma}_{am}$ are, as such, theoretical values, being obtained by propagation of errors. In particular the cofactors $Q_{amam'}$ refer to the assumed mathematical model of the adjustment. Here, however, the main part is played by $\hat{\sigma}_0$, which is an empirical value, as explained above. Hence it can be concluded, that the values $\hat{\sigma}_{am}$ are quite realistic ones in our case.

With the aid of the weight coefficient matrix $Q_{ah}$, the precision of any transformed point is obtained by applying the rule of propagation of errors.

Finally the question of defining an image point remains. The described image correlation of window to window is, in fact, a correlation of areas. However, the purpose of the procedure is to determine parallaxes or to identify homologous points for point transfer. Thus, in the reference window a certain central point must be defined which is represented by the local image area. For this purpose we define a central point $x_s$, $y_s$, by the weighted average:

$$x_s = \frac{\sum_i x_i \cdot (\dot{g}(z_i))^2}{\sum_i (\dot{g}(z_i))^2}, \quad y_s = \frac{\sum_i y_i \cdot (\dot{g}(z_i))^2}{\sum_i (\dot{g}(z_i))^2} \quad (q)$$

Its corresponding point in the transformed window is obtained by applying the transformation parameters.

In (q) the squares of the gradients $\dot{g}$ serve as weights. The standard errors of the coordinates of the transformed point are obtained, as described above, by propagation of errors. With each image correlation the values for $\rho$, $\hat{\sigma}_0$, $\hat{\sigma}_s$ are printed out, thus allowing a quality assessment of the actual correlation.

The coordinates $x_s$, $y_s$ still refer to the coordinate system of the window in question. In order to be able to establish image coordinates, the window-coordinate system must be related to the image coordinate system which is defined by the fiducial marks of the image.

Reversed Transformation

The procedure of image correlation as described is not symmetrical, as one window is transformed onto the other and the gradients are taken from one window only. Therefore, by reversing the direction of transformation a different result will be obtained. When correlating first window 1 to window 2 and then window 2 back to window 1, the resulting coordinate differences of the central point transferred forth and back have been observed to range from 0.2 μm to 1.5 μm. Although these magnitudes are not very large, the method is extended to become almost symmetrical, by taking both windows into account when determining the gradients in equation (1), to make the method completely symmetrical.

The method of image correlation as described above is capable of very high precision. Depending on image texture, the precision of parallax determination or of point transfer reaches the order of 0.5 μm to 1.0 μm in the image or 0.01 to 0.06 pixel size. This result had not quite been expected. However, it has been established and adequately confirmed, that black and white aerial photographs can be relied upon. It should be noted, that stereoscopic parallax measurement does not reach this level of precision.

The above is programmed in computer 1 which determines the horizontal and vertical parallaxes of the center points of both scanning fields via the computed transformation parameters. The horizontal and vertical parallaxes are substantially identical to the points which the operator sees as target points of his measuring marks. It is therefore no longer necessary to visually and exactly determine the parallaxes of homologous points. Rather, the operator approximately positions the fiducial marks on the image point of interest. Thereafter, the parallaxes of the homologous points are determined on the stereo images by the computer and by controlling the motors 3', 4' and 3", 4" are automatically eliminated. This corresponds to a semiautomatic positioning of the measuring marks seen by the operator on the stereo model.

Relative Orientation

Pursuant to the method of the invention, work can be performed already when the relative orientation of both stereo images is established. The stereo images only have to be coarsely preorientated since the computer automatically determines the vertical parallaxes in the image regions to which the operator has gone and then the necessary data for establishing the relative orientation can be obtained therefrom.

Determination of Elevation as, for example, for Digital Topographical Models After the orientation procedures are completed, the elevations of points are automatically determined from X-parallaxes computed from the correlation of image windows. The respective points are selected by the operator or by a suitable software program. For example, they lie on traces that the operator traversed on the model. This is done without the operator having to put his measuring mark precisely on the model.

Deformation Measurements

A particularly important application of the invention will be deformation measurements. The method allows fast measurement of a dense network of arbitrary points in a pair (or several pairs) of photographs. The automatic measurements are processed through conventional analytical procedures to ground coordinates. If then the points, which are not signalized, are transferred by digital image correlation to photographs taken at a later epoch, the original points are identified and can again be correlated in the new pairs of photographs. Thus, displacements or deformations can be assessed.

The main point is, that the relative precision of the method is extremely high (1 $\mu$m), and that no signalization of points is required. The absolute accuracy still depends on the well known image errors and will only reach perhaps 5 or 6 $\mu$m. The only precondition is that vegetation cover will not upset the precision. Application for tectonic deformations and for assessing subsidence in open or underground mining areas, apart from close range application, is feasible.

Point Transfer for Aerial Triangulation

This application has been the primary object of the invention. It is of great importance as it offers an elegant solution of the still cumbersome task of point transfer. The method not only is capable of superior accuracy, it also does away with multiple measurements of the same photograph in combination with all adjacent overlapping photographs. Instead, only the digitized (or processed) image windows are stored and recalled for multiple use. The transferred points are identified by image coordinates, therefore they fit smoothly into any analytical system of aerial triangulation.

Measuring Signalized Points

Another application of the invention is the identification and location of details within a window, by image correlation. The simplest case is the automatic identification and measurement of signalized points. Beyond that the identification of various detail features is feasible. The main point is that, at least initially, the problem is not approached by pattern recognition techniques. In connection with the analytical plotter the operator will classify the type of target in question, the gray-value matrix of which had been stored in the computer. Then after shifting the window under operator control approximately to the point, the computer is left to correlate with the stored matrix and to calculate its exact coordinates.

A further object is line following by shifting the windows along distinguishable line features.

It is understood that the foregoing description is that of the preferred embodiments of the invention and that various changes and modifications may be made thereto without departing from the spirit and scope of the invention as defined in the appended claims.

What is claimed is:

1. An analytical stereo evaluating apparatus comprising:
    two movable image carriages for receiving stereo images thereon;
    binocular viewing tube means defining mutually adjacent optical viewing channels for viewing the images on said carriages;
    light source means for projecting respective beams of light into said viewing channels so as to illuminate said images for viewing by an operator;
    computer-controlled drive means for movably adjusting said carriages with respect to said viewing beams;
    two first optical means for reflecting respective measuring marks into corresponding ones of said channels for viewing by the operator; and,
    an ancillary device for photoelectrically scanning subregions of the stereo images, the ancillary device including:
    two beam splitters arranged in respective ones of said viewing channels for diverting a portion of the light away therefrom to define respective diverted light beams;
    two 2-dimensional photoelectric detector arrays arranged in the paths of said diverted light beams, respectively;
    two second optical means arranged in the paths of said diverted light beams for imaging the respective central parts of the viewed images on said photoelectric arrays, respectively;
    computer means receiving video signals from said arrays for storing the same as gray-value matrices and for correlating the latter with each other; and,
    feedback means connecting said computer means to said drive means for transmitting feedback signals to the latter to movably adjust said carriages.

2. The analytical stereo evalvating apparatus of claim 1, said imaging scale of said first optical system being a number other than unity; and, said beam splitters being configured so as to cause the light of said diverted beams to be less than fifty percent of the light of said viewing beams projected by said light source means.

3. Method of computer-supported, semiautomatic evaluation of aerial stereo images with the aid of an analytical plotter equipped with an arrangement for photoelectrically scanning subregions of said images, respectively, and for digitally processing the scanned subregions, the method comprising the steps of:
    coarsely preorientating the stereo images;
    moving to selected points on the stereo images and adjusting said points to position the same to lie in the effective region of the scanning field;
    generating gray-value matrices of the image areas obtained from the scanning field;
    digitalizing said gray-value matrices and storing the same in a computer whereby each matrix element is defined by its image coordinates and the photoelectrically determined gray value corresponding thereto;
    correlating the gray-value matrices of both stereo images with each other in two dimensions whereby said matrices are subjected to various geometric and radiometric transformations until the gray-value differences of corresponding matrix elements or the corresponding correlating functions of both fields are minimal; and, utilizing the determined transformation parameters for establishing in a computer-controlled manner the orientation of the stereo image pairs.

4. The method of claim 3, comprising the steps of thereafter:

determining the coordinates of non-signalized points on the stereo images as weighted mean points of the scanning field adjusted thereto;

storing said non-signalized points with the gray-value matrices corresponding thereto for the purpose of point measurement, point transfer and deformation measurement in the computer;

comparing the position of said points with corresponding points on stereo images subsequently placed in the stereo evaluation apparatus whereby the gray-value matrices of said corresponding points are correlated with the stored gray-value matrices from the first measured images.

5. The method of claim 3 for measuring signalized points on the stereo images, the method comprising:

manually coarsely positioning the scanning field to said signalized points;

generating gray-value matrices of the image region to which said positioning was made and storing the same in the computer;

correlating said gray-value matrices with synthetic gray-value matrices describing the geometric form of the fiducial marks; and, computing the exact coordinates of the fiducial points from the result of the correlation.

6. The method of claim 3, comprising the step of transforming the gray-value matrices in iterative steps between which the newly formed coordinates of each matrix element are obtained by a bilinear interpolation of the value from four neighboring matrix elements.

7. The method of claim 3, comprising computing and printing the values for the correlation coefficients $\rho$ and the standard deviations $\sigma$ for the coordinates of every correlated image point.

* * * * *

UNITED STATES PATENT AND TRADEMARK OFFICE
CERTIFICATE OF CORRECTION

PATENT NO. : 4,669,048

DATED : May 26, 1987

INVENTOR(S) : Fritz Ackermann et al

It is certified that error appears in the above-identified patent and that said Letters Patent is hereby corrected as shown below:

In column 5, line 11: delete "$G_2=G_2(x''_i,y''_i)=G_2(x_i,y_1)$" and substitute -- $G_2=G_2(x''_i,y''_i)=G_2(x_i,y_i)$ -- therefor.

In column 6, line 32: delete "$=g_1(x_i) - g_1(x_i) \cdot x_0$" and substitute -- $=g_1(x_i) - \dot{g}_1(x_i) \cdot x_0$ -- therefor.

In column 6, line 41: delete "$=-\dot{g}_1(x_i) \cdot x_0$" and substitute -- $=-\dot{g}_1(x_i) \cdot x_0$ -- therefor.

In column 7, line 49: delete "$h_k$" and substitute -- $h_k.$ --.

UNITED STATES PATENT AND TRADEMARK OFFICE
CERTIFICATE OF CORRECTION

PATENT NO. : 4,669,048　　　　　　　　　　　　　　Page 2 of 2

DATED　　: May 26, 1987

INVENTOR(S) : Fritz Ackermann et al

It is certified that error appears in the above-identified patent and that said Letters Patent is hereby corrected as shown below:

In column 8, line 26: delete "$\bar{g}_1''(z_1, a_m^0, h_k^0)=$" and substitute -- $g_1''(z_i, a_m^0, h_k^0) =$ -- therefor.

In column 8, line 66: delete "$\bar{g}''_1 = g'_1 \cdot h_1 + h_2$" and substitute -- $g_1'' = g_1' \cdot h_1 + h_2$ -- therefor.

In column 9, line 12: delete "$\int_{g_1 g_2}$" and substitute -- $\rho_{g_1 g_2}$ -- therefor.

In column 9, line 28: delete "$\sigma_0^2 =$" and substitute -- $\hat{\sigma}_0^2 =$ -- therefor.

In column 12, line 41: delete "evalvating" and substitute -- evaluating -- therefor.

Signed and Sealed this

Second Day of February, 1988

Attest:

DONALD J. QUIGG

*Attesting Officer*　　　　　　*Commissioner of Patents and Trademarks*